Figure 1:
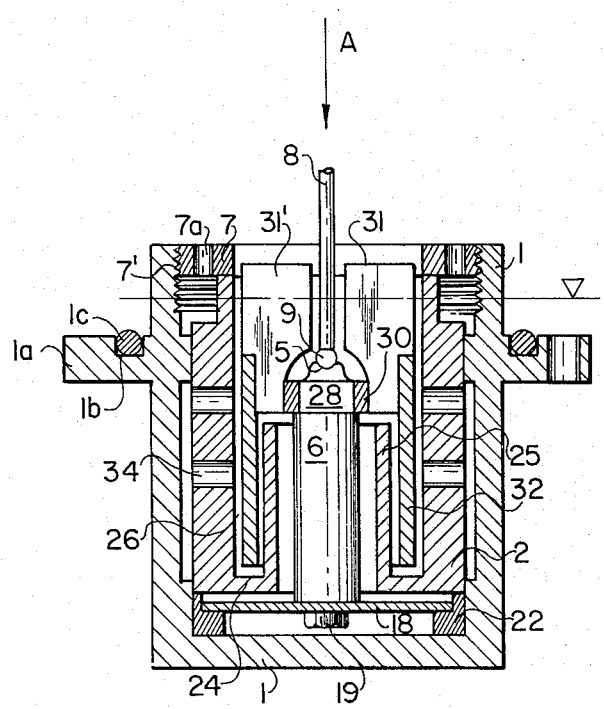

United States Patent [19]

Hepp et al.

[11] 3,913,991
[45] Oct. 21, 1975

[54] LOWER BEARING FOR ROTORS WHICH REVOLVE AT HIGH SPEEDS AND HAVE AN ESSENTIALLY VERTICAL AXIS OF ROTATION

[75] Inventors: Wolfgang Hepp, Immenstaad; Klaus Pimiskern, Friedrichshafen; Werner Herbert, Markdorf, all of Germany

[73] Assignee: Dornier System GmbH, Germany

[22] Filed: June 25, 1973

[21] Appl. No.: 373,158

[30] Foreign Application Priority Data
Aug. 16, 1972 Germany.............................. 2240126

[52] U.S. Cl. .............................................. 308/144
[51] Int. Cl. ........................................... F16c 27/00
[58] Field of Search ........... 308/144, 145, 146, 141, 308/140, 139, 156, 159

[56] References Cited
UNITED STATES PATENTS
2,233,781   3/1941   Indergand........................... 308/145

Primary Examiner—Charles J. Myhre
Assistant Examiner—Frank Susko
Attorney, Agent, or Firm—James E. Bryan

[57] ABSTRACT

This invention relates to an improvement in a lower bearing for a rotor having a substantially vertical axis of rotation and adapted to rotate at high speeds, particularly with a shaft having a spherical shaft end provided with spiral grooves and received in a stationary ball cup, wherein said ball cup is elastically connected with a bearing housing by means producing a restoring force, the improvement comprising a stationary, axially symmetrical first damper means positioned in the lower portion of said bearing housing concentrically with respect to said shaft and at least enclosing a carrier of said ball cup, said damper means forming with said bearing housing an upwardly open ring slot, and a second damper means secured to said stationary ball cup and projecting into said ring slot, and carrying baffle means extending radially and in the direction of said shaft, said baffle means enclosing said ball cup and at least part of said shaft.

9 Claims, 3 Drawing Figures

U.S. Patent  Oct. 21, 1975  3,913,991

LOWER BEARING FOR ROTORS WHICH REVOLVE AT HIGH SPEEDS AND HAVE AN ESSENTIALLY VERTICAL AXIS OF ROTATION

The present invention relates to a lower bearing for rotors having an essentially vertical axis of rotation and which revolve at high speeds. The invention particularly relates to bearings with a spherical pivot or shaft end received or accommodated in a stationary ball cup or socket and provided with spiral grooves, wherein the stationary ball cup part is elastically connected with the bearing housing by means of a device which produces restoring forces, for example a rod which is supple and bendable, or a membrane or diaphragm.

For high-speed devices, such as gyroscopes, centrifuges, and the like, pedestal bearings are often used, which are composed of a rotatable shaft with a hemispherical shaft end and a counter-piece which is formed by a ball cup or socket. The end of the shaft has spirally-extending grooves or notches at the spherical surface thereof. Between the ball cup and the hemispherical shaft end, a supporting lubricating film is built up due to the feeding effect of the spirally-shaped grooves.

The vibrations which arise due to the imbalance of the rotating gyroscope, or rotor, or the like, are elastically absorbed by means of a device which produces restoring forces, for example by means of a bendable rod rigidly clamped in within the housing and connected to the ball cup, or with the aid of a membrane or diaphragm clamped in within the housing. In order to avoid an upswinging of the movable bearing parts especially when passing through the critical speed, damper means are customarily used, in which damper members connected with the movable bearing parts dip or are immersed in an oil bath. The oil bath is therein simultaneously employed for the lubrication of the spiral groove bearing.

Known constructions of lower bearing units for high-speed rotors having a vertical axis of rotation are so constructed and arranged that a stationary bearing carrier is threaded onto a needle which is supported by a membrane or diaphragm. The membrane or diaphragm is bolted onto the bearing housing between two holding or retaining rings, and simultaneously centers the bearing carrier. The vibration damping takes place customarily in the part of the bearing which is not connected with the rotor, between the bearing housing and separate or specific damper members connected with the membrane or diaphragm, with oil in the bearing housing.

Also known in the art are constructions in which a damper device together with an oil bath is present in the rotating part. Disadvantageous in this case is the increase of the additionally rotating masses. Further adverse consequences of the aforementioned bearing constructions become apparent in the lack of economy of operation and reliability of such bearings. With the known construction of the damper members, a vertical revolution of the oil, i.e. in the direction of the rotor shaft, within the bearing housing is obstructed. Furthermore, in the case of rotors which must run or operate in a vacuum, evacuation of the oil chamber is very cumbersome because of the formation of bubbles, and this operation can be carried out during assembly and maintenance operations only by means of a slow, and therefore time-consuming, pumping down of the air content. The oil turbulence produced at the rotating rotor and/or the spherical end thereof prevents a uniform flow of the lubricant to the bearing surfaces and, in case of a stable turbulence formation, may lead to the failure of the lubricant supply.

It is the object of the present invention to obviate the aforementioned economic and technical disadvantages of the prior art bearing constructions and to provide a spiral groove bearing which has a high degree of precision and is suitable for mass production.

This object is obtained, in accordance with the present invention, by virtue of a damper device composed of a. a stationary, axially symmetrical damper member in the lower portion of the bearing housing positioned concentrically with respect to the center of rotation of the rotor, and enclosing at least the carrier of the ball cup, which damper member forms with the bearing housing an upwardly open ring slot, and b. a damper member attached to the non-rotating bearing part which projects into the oil-filled ring slot and carries baffles extending radially and in the direction of the axis of rotation of the rotor, and enclosing the bearing as well as at least part of the rotor pivot or shaft.

The provision of the movable damper member with vertically and radially-directed baffles prevents the formation of oil vortices or turbulences in the area of the rotating rotor shaft end, and particularly in the area of the bearing itself. At the same time, the damper surface formed by the damper member is considerably increased by the baffle surfaces. The oil circulation in the vertical direction, i.e. in the direction of the rotor pivot or shaft, is possible without obstruction since no closed bottom is present between the sleeve-shaped damper member and the baffles.

According to an advantageous further realization or embodiment of the present invention, one feature consists in that the baffles and the damper member are integral. It is also proposed that the damper member and/or the baffles be connected by virtue of a force or press fit with the non-rotating bearing carrier. The manufacture of the movable damper member as a die-cast element or ingot-mold element, as well as the connection between the damper member and the non-rotating bearing carrier which is established by pressing-on makes possible an extremely simple construction of the damper member with the bearing, such as is sought to be obtained for a mass or series production. The simple and compact construction of the bearing is likewise advantageous for economical production, storage, and assembly.

An additional simplification of the bearing construction is obtained, in accordance with the present invention, by virtue of the fact that in the case of providing the bearing with a bending rod which is clamped into the bearing housing and produces restoring forces, this bending rod is firmly pressed into a central bore of the non-rotating bearing carrier. Such a construction represents a further simplification of the bearing in which the non-rotating bearing carrier constitutes one unit with the damper member and the baffles as well as the bendable rod which is simple to make.

Figure 2:
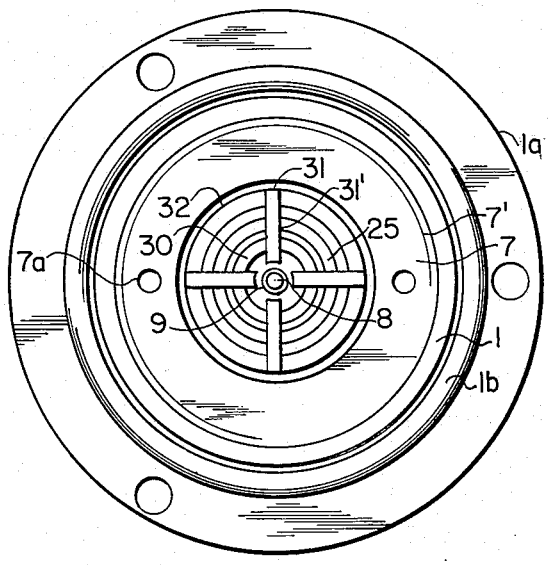
Figure 3:
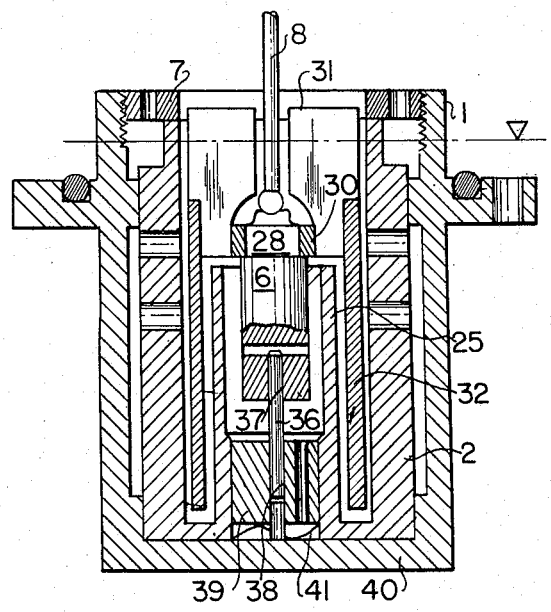

Two embodiments of the lower bearing of a rotor are illustrated in the accompanying drawings, wherein FIG. 1 is a longitudinal cross-sectional view through the lower bearing in conjunction with a membrane or diaphragm unit producing restoring forces;

FIG. 2 illustrates the lower bearing in a top plan view thereof according to the arrow A of FIG. 1, and FIG. 3 is a longitudinal cross-sectional view through the lower bearing in conjunction with a device containing a bendable rod for the purpose of producing restoring forces.

In FIG. 1, reference numeral 1 identifies the pot-shaped bearing housing. The bearing housing 1 receives a sleeve-shaped insert 2 between which latter and the bottom part of the bearing housing there is positioned an annular or ring part 22. The annular or ring part 22 serves for receiving a membrane or diaphragm 18 which, in the area of the outer circumference thereof, is connected with the ring part. The ring part 22 and the insert 2 are firmly clamped in within the bearing housing 1 by means of a screw cap 7 having a thread 7'. By way of a bolt means 19 the membrane or diaphragm 18 is rigidly connected with a bearing carrier 6 which includes at the upper end thereof the ball cup 5 for receiving the spherical part 9 of the rotor pivot or shaft 8. The bearing housing 1 has at the outside thereof a flange 1a in which a continuous ring slot 1b is provided and which serves for receiving an O-ring 1c. By virtue of and with this seal, it is assured that the bearing is sealed off against the atmosphere during vacuum operation. Positioned within the insert 2 is a sleeve part 25 which is concentric with respect to the rotor pivot or shaft 8 and is connected via a bottom wall 24 with the insert 2. The insert 2 and the part 25 represent in this case the stationary damper member. By means of the insert 2 and the damper member 25, an upwardly open ring slot 26 is formed which is filled with oil. In the screw cap 7 are the bores 7a for purposes of evacuation.

The elastic positioning or mounting of the bearing carrier 6 formed or constituted by the membrane or diaphragm 18 on which carrier the ball cup 5 is mounted absorbs the gyroscopic vibrations which, in the case of a rigid positioning, would lead to the destruction of the rotor (not shown herein).

In order to prevent a resonance of the vibratory elements, particularly when passing through the critical rotor frequencies, a damper device is provided which contains a damper member 32 which is concentric with respect to the rotor pivot or shaft. The damper member 32 projects with radial play into the ring slot 26 which is filled with oil. At the upper end of the damper member 32 in the area of the rotor pivot or shaft and the bearing with the ball cup 5 and the sphere 9, baffles 31 are formed which have baffle surfaces 31', which baffles are uniformly distributed over the circumference and extend between the insert 2 and the rotor pivot or shaft 8 radially and in the direction of the rotor pivot or shaft. The baffles 31 in conjunction with the cylindrical damper member 32 are firmly pressed onto a collar 28 of the bearing carrier 6 by way of an annular part 30. The damper member 32 and the baffles 31 as well as the annular part 30 are integral. The baffles 31 enclose the rotor shaft 8 with the smallest possible clearance and serve for preventing an oil turbulence formation due to the rotation of the rotor shaft 8 and the spherical part 9 attached or secured thereto, so that the supply of lubricant to the bearing surfaces is not interrupted. In addition thereto, by virtue of the vertically-directed baffles 31, the effective damper surface is increased considerably without influencing the mass of the damper member 32. The vertical oil rotation or circulation as well as the evacuation of the oil for assembly and maintenance work, especially also during vacuum operation, is readily possible since the movable damper member 32 affords a good passage due to the arrangement of the baffles 31 in the vertical direction.

All the cavities within the bearing housing 1 and the insert 2 are interconnected by the bores 34 so as to assure during evacuation a bubble-free pumping of the air, thus rendering the bearing suitable for vacuum operation.

In the construction of the lower bearing shown in FIG. 3, a bendable rod 36 is provided between the bearing carrier 6 and the housing 1 and the insert 2. The bendable rod 36 is firmly pressed at one end thereof into a bore 37 of the bearing carrier 6, and the other end is pressed into a bore 38 of a guide piston 39 which is axially movable in the insert 2. Inserted between the guide piston 39 and the bottom wall 40 of the bearing housing 1 are the corrugated disc springs 41. The damper device with the movable and the stationary damper part or member corresponds to the embodiment illustrated in FIG. 1. The elements have again been identified with reference numerals 30, 31, 32 and 25. If disturbances arise while the rotor revolves, as a consequence of which the rotor shaft is forced out of its central position, the vibrations produced at that time, for example precession and nutation vibrations, are damped by means of the damper device 32, 31, 25 of the lower rotary bearing. By means of the bendable rod 36 which is radially supported against the stationary housing, radial restoring forces are transmitted for the stabilization of the rotor. Independently thereof, the vibrations of the rotor generated in the direction of the rotor shaft 8 are absorbed by the axial spring means or system 41 in conjunction with the guide piston 39. Via the bearing carrier 6 and the bendable rod 36 as well as the guide piston 39 movably guided within the insert 2, the axial vibrations are introduced into the spring means or system 41 supported against the housing 1, and an axial restoring effect is brought about independently of the radial restoring effect.

The bearing constructions as disclosed herein render possible a compact construction which can be very easily made from an economic point of view, and the precision as well as the useful life of the bearing have a high degree of reliability, as has been found as the result of practical tests.

It will be obvious to those skilled in the art that many modifications may be made within the scope of the present invention without departing from the spirit thereof, and the invention includes all such modifications.

What is claimed is:

1. In a lower bearing for a rotor having a substantially vertical axis of rotation and adapted to rotate at high speeds, particularly with a shaft having a spherical shaft end provided with spiral grooves and received in a stationary ball cup, wherein said ball cup is elastically connected with a bearing housing by means producing a restoring force, the improvement comprising a stationary, axially symmetrical first damper means positioned in the lower portion of said bearing housing concentrically with respect to said shaft and at least enclosing a carrier of said ball cup, said damper means forming with said bearing housing an upwardly open ring slot, and a second damper means secured to a stationary bearing part and projecting into said ring slot, and carrying baffle means extending radially and in the direction of said shaft, said baffle means enclosing the bearing and at least part of said shaft.

2. A bearing according to claim 1 in which the baffle means and the second damper means are integral.

3. A bearing according to claim 1 in which the second damper means and the baffle means are connected with the carrier of said ball cup by a press fit.

4. A bearing according to claim 1 including an annular part connecting said second damper means and said baffle means with the carrier of said ball cup.

5. A bearing according to claim 1 including means mounting said baffle means with the smallest possible play between said baffle means and said shaft and cup, while permitting radial movements of said shaft and cup.

6. A bearing according to claim 1 including stationary cylindrical insert means within said bearing housing, which insert means carries said first damper means at the bottom thereof and which, together with said insert means, constitutes said ring slot.

7. A bearing according to claim 1 including a bendable rod clamped in within said bearing housing for producing restoring force, said bendable rod being received in a central bore of said carrier of said ball cup.

8. A bearing according to claim 1 including a membrane unit for producing restoring force, and stationary cylindrical insert means in said bearing housing, said insert means fixing the position of the membrane unit within said bearing housing.

9. A bearing according to claim 8 in which said insert means is secured in said bearing housing by threaded top means.

* * * * *

UNITED STATES PATENT OFFICE
CERTIFICATE OF CORRECTION

PATENT NO. : 3,913,991
DATED : October 21, 1975
INVENTOR(S) : Wolfgang Hepp, Klaus Pimiskern, and Werner Herbert It is certified that error appears in the above--identified patent and that said Letters Patent are hereby corrected as shown below:

Column 5, line 4, "a", second occurrence, should read - - - said - - -; lines 3 and 4, "bearing part" should read - - - ball cup - - -; line 8, "the bearing" should read - - - said ball cup - - -.

Column 5, Penultimate line, the word - - - ball - - - should appear after "and".

Column 6, line 1, the word - - - ball - - - should appear before "cup".

Signed and Sealed this twenty-seventh Day of January 1976

[SEAL]

Attest:

RUTH C. MASON
Attesting Officer

C. MARSHALL DANN
Commissioner of Patents and Trademarks